April 18, 1961  A. VANG  2,980,789

WELDING APPARATUS

Filed Sept. 18, 1957

INVENTOR,
Alfred Vang.

BY *Peter M. Bocuny*

ATTORNEY.

United States Patent Office 2,980,789
Patented Apr. 18, 1961

2,980,789
WELDING APPARATUS

Alfred Vang, Rancho, P.O. Box 864, Santa Fe, Calif., assignor of one-third to Alfred Vang, as trustee, and one-third to Anna Vang Filed Sept. 18, 1957, Ser. No. 684,741

3 Claims. (Cl. 219—114)

This invention relates to welding and more particularly to welding apparatus which supply measured amounts of energy to a given set of work pieces.

Especially when the commercial source of current for welding is A.C. a large portion of the power drawn from the mains is "low grade" power, that is, over a full cycle the average power is for much of the time well below that of the maximum instantaneous power delivered by the mains.

In resistance welding of massive work the inherent variation of the power cycle is often not sufficiently evident in poor quality welds although the economy of the operation may be very much below what can be attained when only the high power portion of the cycle is utilized.

When the work pieces are light, excessive use of power not only is expensive but produces distortions and changes in the work pieces with undesirable results.

Ideally, two clean work pieces to be welded should become molten, or in a state for diffusion of material of one to the other, for only a depth of a few molecules. If the pieces are not clean, as from oxide, the foreign matter should become expelled if possible without damage to the metal. The expulsion can best be done by volatilizing the impurities with or without decomposition. Sometimes vaporizing of only a small portion of metal or impurity is sufficient to sweep, mechanically, a much larger amount of impurities from the surfaces just before welding.

It is thus seen that the goal to reach is the mere superficial heating of the material at the surfaces of the welding pieces. This can best be done by supplying energy to the pieces in sudden bursts with the object of suddenly heating the surface zones without time for heat penetration into the body of the work pieces.

An object of the invention is to provide a control for welding current connected to work pieces.

Another object is to provide a means for applying pulses of current to work pieces in a controlled relationship to the resistance of the weld produced.

Another object of the invention is to provide a control system governed by a series of tracer pulses impressed on the welding current line.

The attainment of these and other objects pointed out below is shown in connection with a welding device which, briefly described, includes a system of mercury arc tubes selectively ignited to control the flow of electrical power from a source to a welding transformer, and means for controlling the ignition of the tube system in dependence on the nature of the weld produced.

Figure 1:
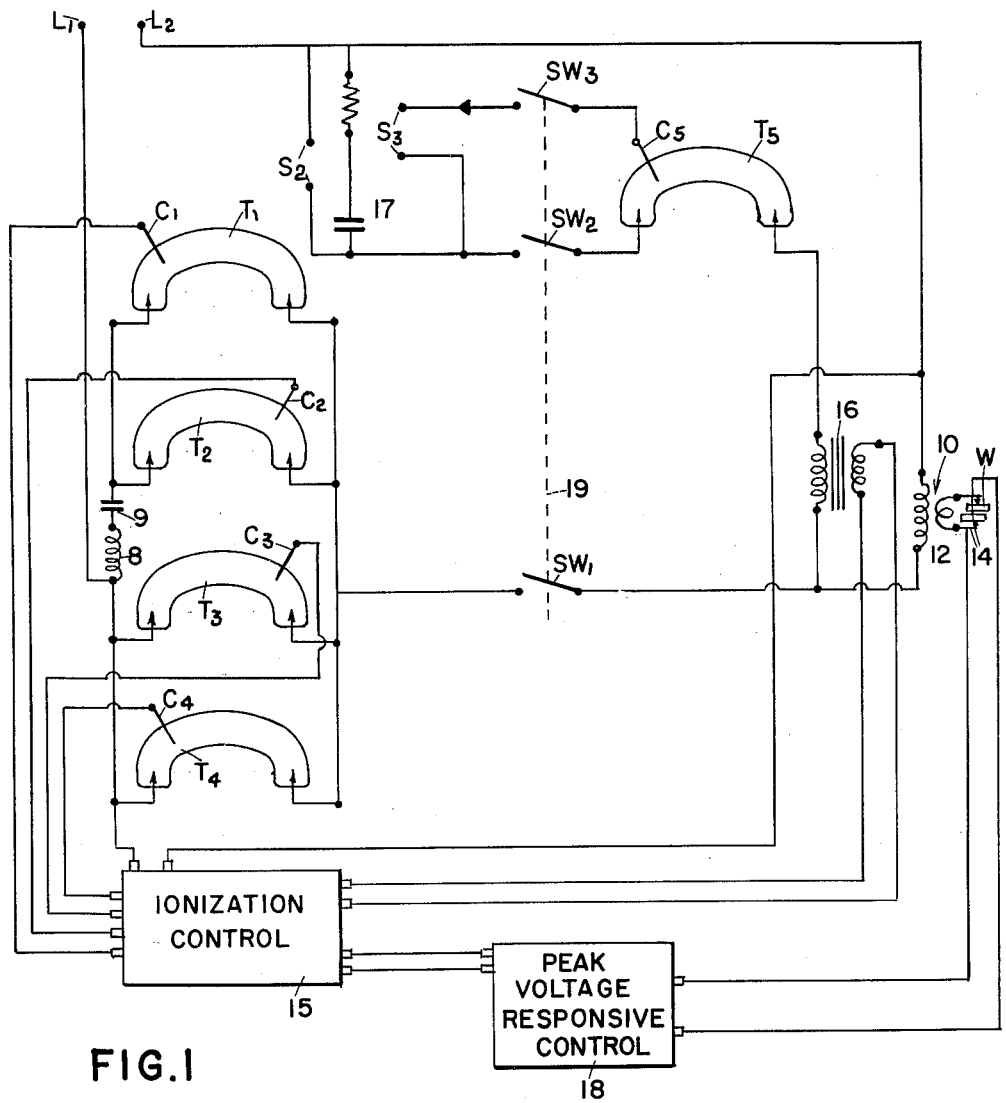
Figure 2:
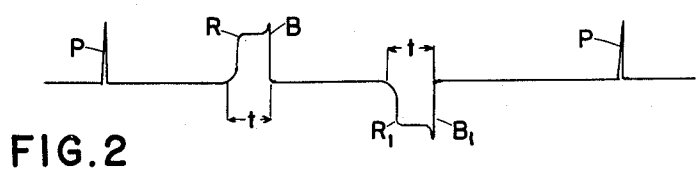

In the accompanying drawing showing, by way of example, one of many possible embodiments of the invention, Figure 1 is a schematic representation of the welding device, and Figure 2 shows a wave pattern of current applied to the welding transformer.

In Figure 1 lines $L_1$, $L_2$ to a source of current (not shown) are connected through four tubes $T_1$, $T_2$, $T_3$ and $T_4$ of the mercury arc type to a welding transformer 10 at the primary winding 11 thereof. The secondary winding 12 of the transformer is then connected to a pair of welding electrodes 14 engageable with work pieces W.

The line $L_1$ is divided so as to contain a loop, say, 6, $T_1$, 7, $T_4$ and contains an inductor 8 and a capacitor 9. The two other tubes $T_2$ and $T_3$ are connected directly, in opposition, with the tubes $T_1$ and $T_4$. Triggering electrodes $C_1$, $C_2$, $C_3$, $C_4$ are provided for ignition of the tubes in a manner well known to the art. For convenience, the connections to the cathodes to be ignited have been omitted from the drawing but the ignition connectors are shown in connection with tube $T_5$ whose function is dealt with below. The ignition of the tubes in the line $L_1$ is controlled by an ionization control 15, the general nature of which is well known to the art.

Before describing completely the remainder of the system, it may be preferable to point out the general operation of the system thus far considered.

If the source of current connected at $L_1$, $L_2$ be A.C., the cathode of tube say $T_1$ can be ignited in phase relationship to the source on $L_1$, $L_2$ so that current begins to flow, or the current rises, as at R on Figure 2. Depending on the phase relationship with the current tending to flow through tubes $T_3$ or $T_4$ with that in tube $T_1$, one of the tubes $T_3$ or $T_4$ may now be fired to oppose the flow of current in tube $T_1$, and so extinguish the tube $T_1$ with a fall in current as at B. When the current on $L_1$, $L_2$ reverses, tube $T_2$ may be ignited to allow the negative current to increase as at $R_1$ and, extinguish by igniting tube $T_3$ or $T_4$, whichever tube was not ignited in the prior half-cycle. The tube system $T_1$, $T_2$, $T_3$, and $T_4$ clipping off current when normally at values other than zero is often called a magna quanta generator. Of course separate source of blow-out current (not shown) may be used to extinguish the tubes $T_1$ and $T_2$, or for that matter any of the four tubes.

The timing of the ignition and extinguishing of tubes $T_1$ and $T_2$ determine the amount of current to flow through the primary 11 of the welding transformer.

In the control of the timing, and testing of weld made, I apply a series of momentary tracer pulses P to the output line of the generator, or as shown to the primary 11, which appears on the primary as a pulse P, through a peaking current transformer 16, the output of which governs the ionization control 15. The pulses are obtained from a source of power such as a condenser 17 which may be trickle-charged by a source $S_2$.

The control of the pulses is via an arc-tube $T_5$ interposed between the transformer 16 and the condenser 17. Ignition of the tube $T_5$ is controlled by source of power $S_3$ connected to the cathode of the tube $T_5$ and its control element $C_5$. The source $S_3$ may be a square wave generator or even a direct current. In the latter event, a switch $SW_3$ must be interposed between the source $S_3$ and the control element $C_5$. If the source $S_3$ be a variable potential it is preferable, for safety, still to use the switch $SW_3$. Switches $SW_1$ and $SW_2$ are preferably interposed between the source $S_2$ and the tube $T_5$ and in the main circuit of the primary 11 respectively.

The control 15, reacting to the effect of the first pulse P after a predetermined length of time, ignites one of the tubes $T_1$ or $T_2$, say, to cause the rise R and then the abrupt drop B in the output current due to blow-out. This is done in phase relationship with that of the source on the line $L_1$, $L_2$. The pulse after, say, one cycle from R to $B_1$ is employed to test the weld made on work pieces. If the voltage appearing across the work pieces is too high, another cycle of welding current is applied as through an auxiliary control 18 responsive to peak voltage, across the weld, when the pulse is applied. A welding current control switch $SW_1$ is interposed between the tube set $T_1$, $T_2$, $T_3$, $T_4$, and the transformer 10. The switch $SW_1$ while shown ganged to switch $SW_2$ and $SW_3$, need not be so ganged.

The control 15, employing well known phase shifters, varies the period of duration of current in the respective tubes $T_1$, $T_2$, so that periods $t$ of Figure 2 may be varied in accordance with the voltage drop across the weld of the pieces W. Thus the control 15 may be biased to a short period for $t$ but a high voltage drop across the weld will tend to lengthen the period of $t$ so that an automatic width control is effected.

The invention claimed is:

1. In a welding system, a welding transformer having a secondary winding and welding electrodes connected thereto and having a primary winding, a source of current for the primary winding and discharge tube means for electrically connecting and disconnecting the source to and from the primary winding, means for applying a sudden pulse of current to the primary winding independent of said source to induce a potential across the electrodes distinguishable from the welding current and means responsive to said potential for controlling said tube means.

2. In a welding system, a welding transformer having a secondary winding and welding electrodes connected thereto and having a primary winding, a source of welding current for the primary winding and mercury discharge tube means for connecting and disconnecting the source to and from the primary winding, a source of test current substantially independent from the welding current for inducing a potential across the electrodes and distinguishable from work current at the electrodes, means for applying the test current in abrupt short pulses of current, and control means responsive to the induced potential for controlling said tube means.

3. In a system as claimed in claim 3, said source of test current being a condenser and means for charging same and a discharge tube switch for discharging the condenser through said primary winding.

References Cited in the file of this patent

UNITED STATES PATENTS

| | | |
|---|---|---|
| 2,233,810 | Dawson | Mar. 4, 1941 |
| 2,308,255 | Vedder | Jan. 12, 1943 |
| 2,472,041 | Davies | May 31, 1949 |
| 2,607,893 | Cooper et al. | Aug. 19, 1952 |
| 2,681,428 | Rockafellow | June 15, 1954 |